United States Patent

Hakaridani et al.

[11] Patent Number: 4,516,215
[45] Date of Patent: May 7, 1985

[54] RECOGNITION OF SPEECH OR SPEECH-LIKE SOUNDS

[75] Inventors: Mitsuhiro Hakaridani; Hiroyuki Iwahashi, both of Nara; Yoshiki Nishioka, Tenri, all of Japan

[73] Assignee: Sharp Kabushiki Kaisha, Osaka, Japan

[21] Appl. No.: 416,165

[22] Filed: Sep. 9, 1982

[30] Foreign Application Priority Data

Sep. 11, 1981 [JP] Japan .................. 56-144449

[51] Int. Cl.³ .............................................. G10L 1/00
[52] U.S. Cl. .................................... 364/513.5; 381/43
[58] Field of Search ................................ 381/41–43, 381/110; 367/198; 364/513.5

[56] References Cited

U.S. PATENT DOCUMENTS

| | | | |
|---|---|---|---|
| 4,038,503 | 7/1977 | Moshier | 381/43 |
| 4,282,403 | 8/1981 | Sakoe | 381/43 |
| 4,426,551 | 1/1984 | Komatsu et al. | 381/41 |

*Primary Examiner*—E. S. Matt Kemeny
*Attorney, Agent, or Firm*—Birch, Stewart, Kolasch & Birch

[57] ABSTRACT

Speech recognition using self-correlation (auto-correlation) parameters and time normalization is improved by first making a preliminary decision using lower-order (zeroth to third) self-correlation coefficients derived from the self-correlation function of order m:

$$\phi(m) = \sum_{n=0}^{N-1} X(m)X(n+m)$$

where $\phi(0)$ is the power, $\phi(1)$ is the linear or first order coefficient, and so on.

1 Claim, 4 Drawing Figures

FIG. 3
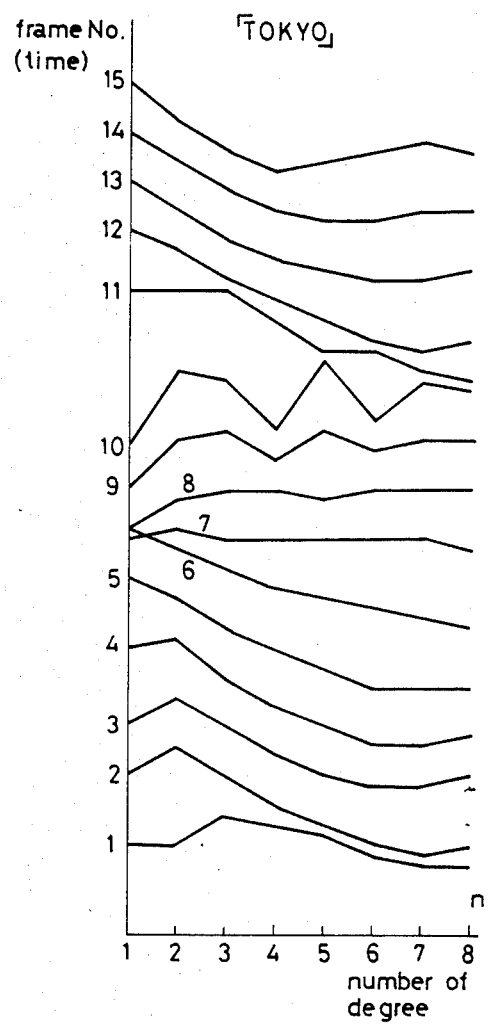
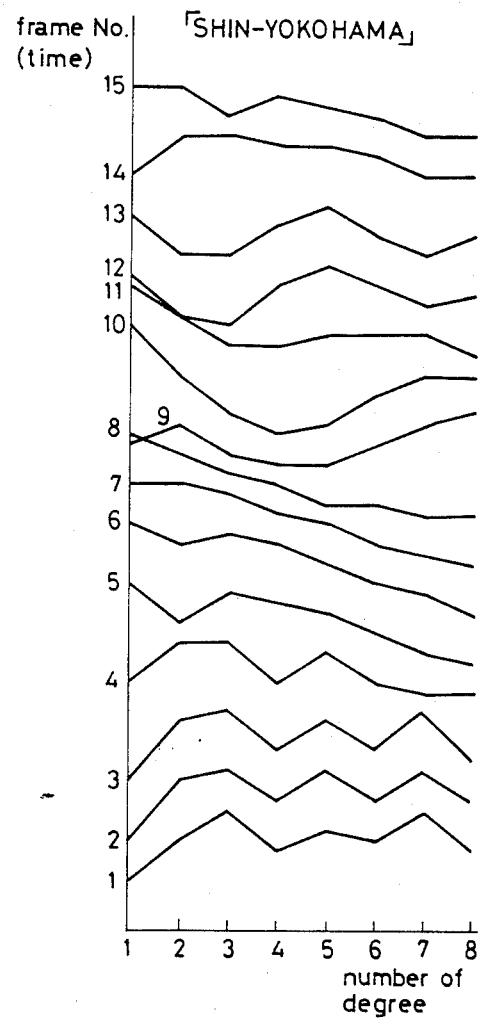

RECOGNITION OF SPEECH OR SPEECH-LIKE SOUNDS

BACKGROUND OF THE INVENTION

This invention relates to a method of speech recognition using short time self-correlation functions as feature parameter, and more particularly it relates to a method of speech recognition featuring preliminary selection.

It is customary in the art of speech recognition that speech-like sounds or words after detected and feature-extracted are compared with reference patterns of a large number of words as registered in advance and identified through the DP matching method or other methods. An attempt to make all of the large number of words the object of recognition and recognize them with high accuracy demands longer time and a special-purpose high speed hardware is necessary in shortening time for recognition. Alternatively, a simple and time-saving recognition method is employed so that the number of words sought to be recognized is limited. Any attempt in the prior art is still defective; the use of the special-purpose hardware makes a speech recognition system expensive; the use of the simple recognition method leads to a decline in recognition rate and limits of the words sought to be recognized limit the scope of applications of the speech recognition system.

It is also obvious that a so-called preliminary selection or pre-verification is carried out to limit the number of object words for recognition prior to execution of a recognition step using the DP matching method or the like.

Several ways of preliminary selection are well known. For instance, a method is reported by which feature parameters characteristic of the lengths of words and the spectra of the beginning and ending of words are used. This method, however, is not suited for simple type speech recognition systems because it involves complex operation and requires setup of those feature parameters for preliminary selection.

Another method of such preliminary selection is also reported by which approximately 10 samples are extracted in an interval from a time series of feature vectors for setup of pattern vectors of about 50 degrees and the number of object words is limited to 20% through verification by linear sampling. This method is not proper for simple type speech recognition systems either.

OBJECT AND SUMMARY OF THE INVENTION

With the foregoing in mind, it is an object of the present invention to provide a method of speech recognition which features an improved preliminary selection and is most suitable for use in simple type speech recognition systems. In other words, the present invention provides a method of speech recognition using short time self-correlation functions as feature parameters for recognition of speech or speech-like words and especially effecting preliminary selection utilizing part of data for final recoginition, that is, short time self-correlation functions of lower degrees (typically, primary to cubic).

In carrying out the above object, the present invention provides a method of speech recognition comprising the steps of creating self-correlation functions for input sound signals, deciding the intervals of the sound signals, normalizing the time axes in conjunction with the sound intervals, and conducting recognition of words or the like through deciding using said self-correlation functions as feature parameters whether there is matching with reference patterns, said method further comprising the step of effecting preliminary selection prior to the final recognization step by means of linear matching using said self-correlation functions of lower degrees.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 is an illustration of variations in self-correlation functions against number of degrees.

DETAILED DESCRIPTION OF THE INVENTION

Figure 1:
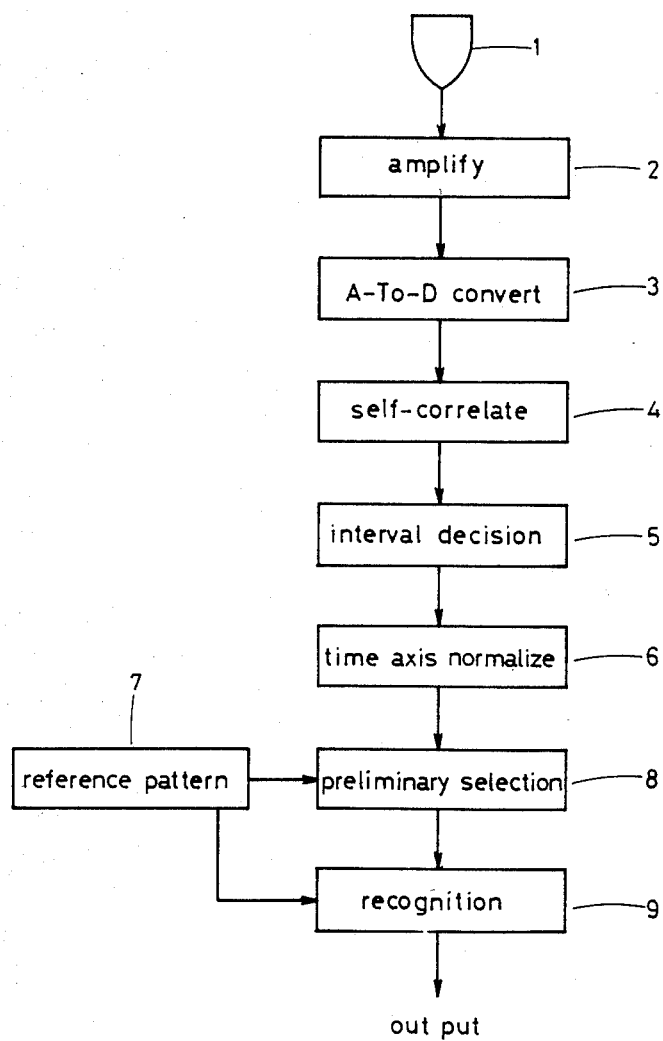
FIG. 1 is a block diagram of the scheme of recognition according to the present invention.

Referring now to FIG. 1, there is illustrated a block diagram of the scheme of speech recognition according to the present invention. Sound inputs introduced via a microphone (step 1) are amplified through an amplifier (step 2) and converted into digital signals via an analog-to-digital converter (step 3). Self-correlation functions are set up by a self-correlation circuit (step 4). These steps are accomplished mainly by a hardware and and carried out to complete feature extraction from the sound inputs.

Thereafter, the intervals of the sound inputs are decided (step 5) and normalized as to its time axes to expand or compress these intervals to frames of a predetermined number (step 6). Preliminary selection is carried out with reference patterns (step 7) by means of self-correlation functions of lower degrees (step 8) to thereby limit the number of object words for recognition to a proper number. Fine recognition is then conducted with preliminarily selected ones of the reference patterns through the DP matching method or other methods (step 9). The results of such recognition are outputted. The steps from the decision as to the intervals of the sound inputs (step 5) through the final recognition (step 9) are accomplished mainly by a software. The respective steps in FIG. 1 will be described in more detail. The amplifier (step 2) has a frequency characteristic of 6 dB/oct. In the light of the fact that the higher frequencies in the frequency spectra of the vocal cords the lower energy, this offers correction that keeps the level of energy as constant as possible.

The sound inputs or analog signals are converted into the digital signals through the analog-to-digital converter (step 3). For recognition of speech or speech-like sounds, the signals are generally sampled at a frequency of between 8 and 24 KHz into samples each represented by the digital signals of 6 to 12 bits. In an example given herein, the sampling frequency is 8 KHz and the representation of the digital signals consists of 8 bits.

The self-correlation circuit 4 evaluates the self-correlation function $\Phi(m)$ as follows:

$$\phi(m) = \sum_{n=0}^{N-1} \chi(n)\chi(n + m)$$

where $\chi(n)$ is the sample value from the analog-to-digital converter 3, m is the number of the degree of the self-correlation functions, N is the number of the samples in a frame, $\Phi(0)$ is the square of the sample value, i.e., the power of voice and especially $\Phi(1)$ is the linear self-correlation function, $\Phi(2)$, $\Phi(3)$ and so forth are the quadratic, cubic and so forth self-correlation functions. The self-correlation functions of up to the 24th degree are generally used as feature parameters for recognition of speech or speech-like sounds and the number of necessary degrees is dependent upon the sampling frequency, whereas those of up to the eighth degree are used in the illustrated example.

The length of the interval where the self-correlation functions $\Phi(m)$ are evaluated, i.e., the width of frames is determined by N and the sampling frequency and generally selected within 8 to 30 msec. In the illustrated example, N=128 and the sampling frequency is 8 KHz so that the frame width is 16 msec. The self-correlation functions of 0th to 8th degrees so calculated are represented by 16 bit digital numbers. Since the self-correlation functions $\Phi(m)$ so calculated vary with the amplitude of the sound inputs, the self-correlation functions $\Phi(m)$ are normalized with $\Phi(0)$ so as to avoid the impact of such variation. That is, preliminary selection and recognition are effected using the self-correlation functions R(m) which are evaluated below:

$$R(m) = \frac{\Phi(m)}{\Phi(0)}$$

There are several ways available for determination as to the intervals of the sound inputs. While the intended task may be achieved through any one of those ways, the beginning and ending of words are sensed to determine the intervals of the sound inputs based only upon the power $\Phi(0)$ in the illustrated example. The length of words is properly selected and typically its frame numbers are selected between 13 and 96 (that is, time conversion shows that it lasts for 0.2 to 1.5 sec).

The sound inputs passing through all of the foregoing steps include patterns of different lengths covering from 13 frames to 96 frames. If those patterns are loaded into a memory as they are, then not only a memory of a large capacity is necessary but also matching processes among patterns of unequal lengths becomes more complex. To avoid this normalization is necessary as for the time axes of the respective intervals of the sound inputs. The normalization of time axes is to expand or compress the patterns of different lengths into those of a proper uniform length. Although various ways of expansion and compression seem available for this purpose, linear expansion and compression is used to normalize those patterns into 16 frames in the illustrated example.

Assume now that the frame number of the input deemed as a voice input is 1 with its feature vector $\vec{a}(i)$. The relation between $\vec{a}(i)$ and $\vec{b}(r)$ is selected as follows where $\vec{b}(r)$ is the feature vector of a signal obtained from the normalization of time axies.

(1) The first frame $\vec{b}(1)$ of the normalized signal is the average of $\vec{a}(1)$ and $\vec{a}(2)$. In other words, $$\vec{b}(1) = \frac{\vec{a}(1) + \vec{a}(2)}{2}$$

(2) The remaining frames (1—1) of the original sound input are segmented into 15 intervals and the average of the feature vector $\vec{a}(i)$ of the leading frame in each of these frames and the feature vector $\vec{a}(i+1)$ in the next succeeding frame is made equal to the feature vector $\vec{b}(r)$ in the frames of the normalized signals. In other words, $$\vec{b}(r) = \frac{\vec{a}(i) + \vec{a}(i + 1)}{2} \quad (r = 2 \text{ to } 16)$$

The relation between i and r is as follows:

$$i = \frac{(r - 2)(l - 1)}{16} + 2$$

Figure 2:
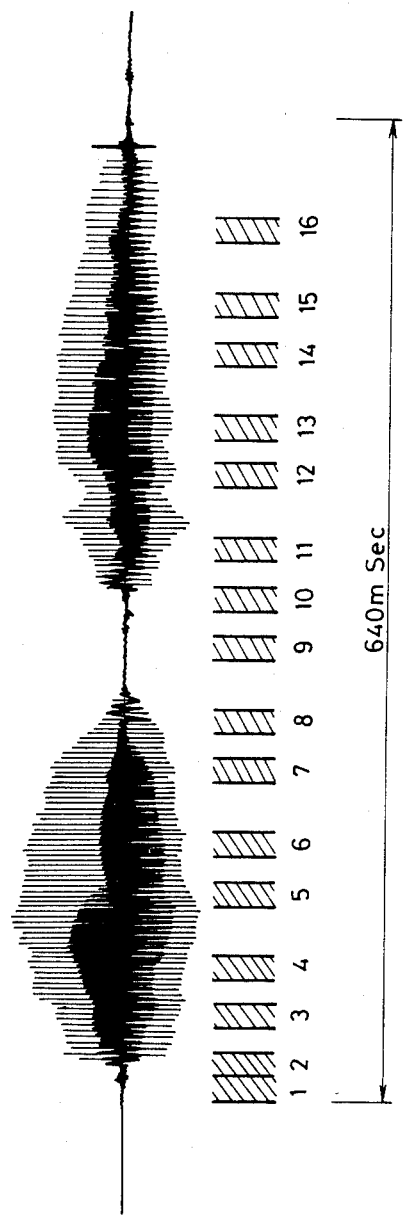
FIG. 2 is an illustration of an example of time axis normalization.

An example of expansion and compression of frames is depicted in FIG. 2 when a voice input "TOKYO" is normalized as for time axes. Within the interval of the voice input "TOKYO" (typically, 640 msec) or a frame width of 16 msec there are 40 frames. Should the 40 frames be compressed into 16 frames, frames as defined by the oblique lines are selected and the feature vector a(i) of those frames, i.e., the average of the self-correlation function and the feature vector $\vec{a}(i+1)$ in the next frame is equal to the feature vector b(r) (r=1—16) of the normalized input consisting of 16 frames.

FIG. 3 depicts variations in the self-correlation functions of the 1st to 8th degrees as for the sound inputs with normalized time axies in the 1st to 16th frames when the sound inputs are "TOKYO" and "SHINYOKOHAMA", respectively.

Figure 4:
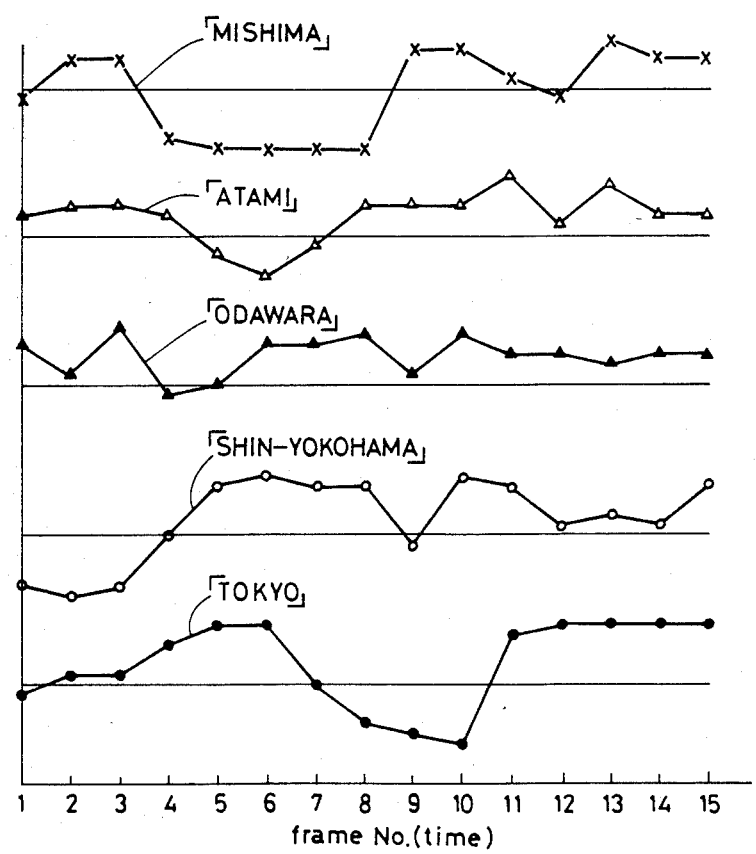
FIG. 4 is an illustration of primary self-correlation functions.

In the illustrated embodiment, the self-correlation functions of lower degrees (for instance, linear to cubic) are selected from the self-correlation functions of the sound inputs for the preliminary selection. FIG. 4 shows the linear self-correlation functions in time sequence or the order of frame numbers as for five different kinds of the normalized sound inputs.

The preliminary selection is carried out by matching between the self-correlation functions of such lower degrees as for the sound inputs and reference patterns composed of lower degree self-correlation functions of sound inputs as registered in advance. In case of using the linear self-correlation functions, the distance $D_K$ between the sound input and (K)th reference pattern is evaluated as follows where $b_1(r)$ is the self-correlation function of the sound input in (r)th frame and $C_{K1}(r)$ is the self-correlation function of (K)th reference pattern in (r)th frame.

$$D_K = \sum_{\gamma=1}^{16} |b_1(r) - C_{K1}(r)|$$

Out of the resultant distances D for the number of the reference patterns (for instance, 32 patterns in the illustrated example), a proper number is selected beginning with the shortest one (16 patterns in the illustrated example).

Recognition and acknowledgement are effected between the sound inputs and all of the preliminarily selected ones of the reference patterns. Although various ways of recognition and acknowledgement seem available, the well-known DP matching method using all of the self-correlation functions of the 1st to 8th degrees is employed in the illustrated embodiment.

The illustrated embodiment is adapted to see if there is DP matching between the sound input B bearing the feature vectors and the normalized time system and the reference patterns C where B and C are as follows:

$$B = b_{(1)}b_{(2)} \ldots b_{(i)} \ldots b_{(16)}$$

$$C_K = C_{K(1)}C_{K(2)} \ldots C_{K(j)} \ldots C_{K(16)}$$

It is noted that $C_K$ is (K)th reference pattern. The matching window is conditioned as follows:

$$|i - j| \leq 1$$

The partial sum $g(i, j)$ of the distance between the sound input B and the reference pattern C is defined below:

$$g(i, j) = \min \begin{pmatrix} 2d(i, j) + g(i-1, j-1) \\ d(i, j) + g(i, j-1) \\ d(i, j) + g(i-1, j) \end{pmatrix}$$

$$d(i, j) = \sum_{m=1}^{8} |b_m(i) - C_{Km}(j)|$$

where $b_m(i)$ is (m)th self-correlation function of the sound input B in (i)th frame and $C_{Km}(j)$ is (m)th self-correlation function of (K)th reference pattern in (j)th frame.

It is appreciated that the distance g (16, 16) traversing the path for the minimum of the partial sum corresponds to the distance between the sound input B and the (K)th reference pattern $C_K$. The distance g (16, 16) is evaluated for all of the preliminarily selected ones of the reference patterns and the reference pattern that gives the minimum distance is acknowledged as equivalent to the sound input B.

As noted earlier, the speech recognition according to the present invention does not require setup of new feature parameters for the preliminary selection and offers a most effective tool in putting compact type speech recognition systems into practice because it takes the full advantage of the self-correlation functions as absolutely required for the final recognition step.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A method of speech recognition comprising the steps of creating self-correlation functions for input sound signals, deciding the intervals of the sound signals, normalizing the time axes in conjunction with the sound intervals, and conducting recognition of words or the like through decisions using said self-correlation functions as feature parameters where there is matching with reference patterns, said method further comprising the step of effecting preliminary selection prior to the final recognition step by means of linear matching using said self-correlation functions of lower degrees.

* * * * *